(12) United States Patent
Alber et al.

(10) Patent No.: US 11,391,059 B2
(45) Date of Patent: Jul. 19, 2022

(54) WINDOW AND/OR DOOR FITTING

(71) Applicant: HOPPE AG, Lana (IT)

(72) Inventors: Helmut Alber, Schlanders (IT); Christian Josef Stephan Zeus, Stilfs (IT)

(73) Assignee: HOPPE AG, Lana (IT)

( * ) Notice: Subject to any disclaimer, the term of this patent is extended or adjusted under 35 U.S.C. 154(b) by 322 days.

(21) Appl. No.: 16/609,163

(22) PCT Filed: Mar. 15, 2018

(86) PCT No.: PCT/EP2018/056611
§ 371 (c)(1),
(2) Date: Oct. 28, 2019

(87) PCT Pub. No.: WO2018/197104
PCT Pub. Date: Nov. 1, 2018

(65) Prior Publication Data
US 2020/0115921 A1     Apr. 16, 2020

(30) Foreign Application Priority Data

Apr. 28, 2017   (DE) .......................... 102017109289.7

(51) Int. Cl.
*E05B 13/00*     (2006.01)
*E05B 13/10*     (2006.01)
*E05B 15/00*     (2006.01)

(52) U.S. Cl.
CPC .......... *E05B 13/004* (2013.01); *E05B 13/005* (2013.01); *E05B 13/101* (2013.01);
(Continued)

(58) Field of Classification Search
CPC .... E05B 13/002; E05B 13/004; E05B 13/005; E05B 13/10; E05B 13/101; E05B 13/106;
(Continued)

(56) References Cited

U.S. PATENT DOCUMENTS

| 613,169 A | * | 10/1898 | Morris | .................. E05B 13/004 |
| | | | | 292/359 |
| 1,575,330 A | * | 3/1926 | Goodman | ................. E05B 3/06 |
| | | | | 70/452 |

(Continued)

FOREIGN PATENT DOCUMENTS

| DE | 373259 | 4/1923 |
| DE | 670268 | 1/1939 |

(Continued)

*Primary Examiner* — Christopher J Boswell
(74) *Attorney, Agent, or Firm* — Reinhart Boerner Van Deuren P.C.

(57) ABSTRACT

The invention relates to a fitting (1) for actuating a mechanism in a door or window, which has a handle (10) that is rotatably supported in or on a stop element (20) about an axis of rotation (D), wherein the stop element (20) can be fastened to the door or window, a drive pin (40) for actuating the mechanism in the door or window, a coupling element (50) for coupling the handle (10) to the drive pin (40), and a blocking device (70), which blocks the actuation of the drive pin (40) about the axis of rotation (D) when in the blocking position (A), wherein the blocking device (70) can be moved to a releasing position (B) through an axial actuation of the handle from a first position to a second position along the axis of rotation (D). In order to ensure increased security against unauthorized actuation of the fitting or the mechanism connected to the fitting in the window or door, and to obtain a fitting that is easy to manipulate and inexpensive to produce, the handle (10) is decoupled from the drive pin (40) in the first position (I), wherein the blocking device (70) is then in the blocking position (A), and the coupling element (50) couples the handle (10) and the drive pin (40) in the second position, and keeps the blocking device (70) in the releasing position (B). When the second position is reached, the handle is coupled (Continued)

to the drive pin, and unlocks it for the actuation of the mechanism.

15 Claims, 14 Drawing Sheets

(52) U.S. Cl.
CPC ........ *E05B 13/106* (2013.01); *E05B 15/0053* (2013.01); *E05B 15/006* (2013.01)

(58) Field of Classification Search
CPC ... E05B 13/108; E05B 15/0053; E05B 15/006
See application file for complete search history.

(56) References Cited

U.S. PATENT DOCUMENTS

| | | | | |
|---|---|---|---|---|
| 1,835,946 A | * | 12/1931 | Jewell | ............... E05B 13/101 70/223 |
| 1,968,285 A | * | 7/1934 | Egan | ............... E05B 13/005 292/172 |
| 4,773,240 A | * | 9/1988 | Foshee | ............... E05B 17/0058 70/222 |
| 6,601,270 B2 | * | 8/2003 | Eckhardt | ............... E05B 15/004 16/412 |
| 8,210,580 B2 | * | 7/2012 | Engel | ............... E05B 15/0053 292/252 |
| 10,012,008 B2 | * | 7/2018 | Karnutsch | ............... E05B 15/02 |
| 2009/0008949 A1 | * | 1/2009 | Lin | ............... E05B 13/108 292/336.3 |

FOREIGN PATENT DOCUMENTS

| | | | | |
|---|---|---|---|---|
| DE | 10100874 | | 9/2002 | |
| DE | 10 2014 103 994 | | 9/2015 | |
| DE | 102014103994 A1 | * | 9/2015 | ........... E05B 13/004 |
| EP | 1544383 | | 6/2005 | |
| KR | 1020170032115 A | | 3/2017 | |
| WO | WO 02/14634 | | 2/2002 | |

\* cited by examiner

WINDOW AND/OR DOOR FITTING

The invention relates to a fitting for actuating a mechanism in a door or a window according to the preamble of claim 1.

Window or door fittings are usually in the form of rotating handles. Such rotating handles or turning handles have stop means such as escutcheons, stop elements, base plates, etc. for securing them to a window sash or a door panel. A mechanism dedicated to the fitting, e.g. a closing mechanism in the window sash or door panel is actuated via a drive pin in the fitting, e.g. a multi-sided pin, usually a square pin.

With a rigid connection between the drive pin and the actuating handle there is the risk with windows, for example, that the window sash will be levered upward against the window frame, and pins used for locking the window sash will have to be actuated with a lever tool from the outside. All of the pins that lock the window are released by the rigid connection between the closing mechanism with the pins and the drive pin in the fitting. With such a design for windows—and doors—there is an increased risk of a break-ins.

Various mechanisms have been developed for preventing this risk of break-ins, which make it more difficult to actuate the drive pin from the outside or through manipulation of the locking pins normally found in the window sash or door panel.

DE 10 2014 103 994 A1 describes a handle device, by way of example, in which a drive element for actuating the closing mechanism is located in a handle. There is a latching mechanism for protecting the handle device against unauthorized actuation from the outside, which blocks a rotation of the handle by moving the handle in relation to the stop element into a blocking position. The handle is moved to a releasing position through a movement in relation to the stop element in order to be able to actuate the closing mechanism in the window or door, thus releasing the latching mechanism. The latching mechanism is formed by a sleeve that has bolts at the ends, which engage in pockets in the stop element when the handle device is in the blocking position. In this manner, the drive element engaged in the closing mechanism of the window or door is also blocked, and the window or door cannot be manipulated from the outside.

The object of the invention is to create a fitting for actuating a mechanism in a door or in a window that has a simpler and more durable mechanism than that in the prior art. The fitting should also increase the protection against unauthorized actuation of the fitting or the mechanism connected to the fitting in the window or door, and be easy to manipulate. A likewise simpler and less expensive construction is also sought.

The main features of the invention are defined in the characterizing portion of claim 1. Embodiments are the subject matter of claims 2 to 15.

With a fitting for actuating a mechanism in a door or a window that has a handle that can be rotated about an axis on or in a stop element, wherein the stop element can be attached to the door or window, which has a drive pin for actuating the mechanism in the door or window, which has a coupling element for coupling the handle to the drive pin, and which has a blocking device that blocks actuation of the drive pin about the axis of rotation, wherein the blocking device can be moved along the axis of rotation into a releasing position through axial actuation of the handle from a first handle position to a second handle position, the invention provides that the handle is disengaged from the drive pin when the handle is in the first position, wherein the blocking device is in the blocking position, and the coupling element couples the handle to the drive pin when the handle is in the second position, and retains the blocking device in the releasing position.

By disengaging the handle from drive pin in the first handle position, it is ensured that the window or door cannot be accidentally actuated, because the mechanism in the window or door can first be actuated when the handle has been moved to the second position. At the same time, the blocking device in the fitting prevents any actuation of the drive pin—as long as the handle is in the first position—i.e. the window or door cannot be manipulated and opened from the outside without permission.

The handle must be moved in two steps in order to open the window or door. First, the handle must be moved from the first position to the second position. Subsequently, the handle must be rotated about its axis of rotation.

The two-step movement of the handle is particularly difficult for children, thus already increasing safety. The blocking device also effectively prevents an unauthorized actuation of the drive pin, and thus the mechanism, from the outside. The door or window is first unlocked when the handle is moved from the first position to the second position. At this point, the coupling element couples the handle to the drive pin. At the same time, the blocking device is moved from its blocking position to the releasing position. The handle, and thus the window or door, can then be actuated as usual.

The combination of decoupling and a blocking device also results in operating safety and protection against break-ins because the blocking device is in a blocking position when the handle is in the first position. This offers the advantage that if a window or door is closed, the handle is in a first position, and the drive pin is prevented from rotating about the axis of rotation by the blocking device. As soon as the window or door is opened, the blocking device is moved to the releasing position by actuating the handle in relation to the stop element, such that the drive pin can be rotated about the axis of rotation by means of the coupling element through the coupling between the drive pin and the handle.

A significant embodiment provides that the coupling element has at least one actuating element for the blocking device. Providing such an actuating element has the advantage that the blocking device can be reliably actuated at any time, and can be brought into the releasing position. If the handle is released, or brought into the first position, the blocking device is returned to the blocking position.

In another embodiment of the invention, the blocking device has at least one blocking element that is located or formed separately in the stop element. This results in an extremely robust design of the blocking device with rolling elements, locking elements, bolts, etc., which increase protection against break-ins, wherein the handle and thus the mechanism in the window or door, can only be actuated when the handle is in the second position and thus coupled to the drive pin, and when in this position, the actuating elements for the blocking elements of the blocking device are moved into the releasing position.

The invention also provides that there is a recess in the stop element for each blocking element. These are also guided reliably and precisely in the stop element, and thus ensure that the drive pin is reliably blocked when in the blocking position.

The blocking elements can advantageously be moved radially or axially in relation to the axis of rotation. Furthermore, in one embodiment the blocking elements can move radially or axially in relation to the axis of rotation inside the recesses.

It is clear that the blocking elements block the movement of the drive pin and thus the movement of the mechanism in a controlled manner in the blocking position, by means of which—with a structurally simple and inexpensive design of fitting—an increased protection against break-ins is obtained. The blocking elements can be advantageously guided and positioned by the recesses in the stop element in relation to the drive pin that is to be blocked. Because they can move axially or radially, the blocking elements can also be moved quickly and precisely by the actuating elements from the blocking position to the releasing position and vice versa. In particular, the stop element can be very compact due to the radial mobility and orientation of the blocking elements.

Furthermore, according to one embodiment of the invention, a radial or axial force is applied each blocking element in relation to the axis of rotation, preferably generated by a spring, i.e. each blocking element is pretensioned in one of the recesses by a spring.

When the blocking elements are pretensioned in position, they must be moved into the releasing position by the actuating elements counter to the force of spring. If instead, the handle is returned to the first position, the springs automatically push the blocking elements back into the blocking position, such that the drive pin and thus the fitting is reliably blocked. This facilitates manipulation of the fitting for moving the blocking device from the blocking position to the releasing position.

Alternatively, the reverse is also conceivable, in which the releasing position is maintained by the pretensioning of the spring, and the blocking position can be obtained by actuating the coupling element.

In another development the blocking elements are directly or indirectly engaged with the drive pin in the blocking position. This results in a particularly space-saving design of the blocking device. As a result, the stop element can be attractively installed on the door panel or window sash, thus giving the fitting an overall aesthetically pleasing appearance.

According to a significant and advantageous development of the invention, the coupling element can have a two-part design, wherein the coupling element has a handle actuator, which is connected to the handle for conjoint rotation, and a drive pin actuator that is connected to the drive pin for conjoint rotation. The two-part design of the coupling element has the advantage that it is possible to actuate the blocking device in a particularly reliable and precise manner, which can also be obtained easily and inexpensively. This also advantageously enables a reliable coupling between the handle and the drive pin, in particular when the handle actuator and the drive pin actuator engage with one another.

The handle actuator is preferably located or secured in the handle, while the drive pin actuator is formed on the drive pin.

It is structurally beneficial when the actuating element of the coupling element is formed on the handle actuator. The actuation of the blocking device only takes place when the coupling is obtained, thus when the handle is in the second position.

In one embodiment, the handle actuator has a flange segment on which the actuating elements are located or formed, wherein the actuating elements are preferably located on a surface of the flange segment facing the stop element. The flange segment helps ensure that the coupling element is reliably retained in the stop element. In addition, the flange segment forms a larger surface for receiving or forming actuating elements, such that they can be sized appropriately for actuating the blocking device.

The invention also provides that there is at least one engagement element on the handle actuator or its flange for a reliable coupling of the handle to the drive pin via the handle actuator and the drive pin actuator. This or these engagement element(s) is/are preferably located or formed on the surface of the flange segment. Placing the engagement element on the flange has the advantage that the engagement elements can be placed on a larger surface, such that the engagement elements can be larger, and greater forces can be transferred via the engagement elements. This ensures a reliable coupling.

Another optional structural measure provides that the engagement elements are formed as an integral part of the actuating elements. This advantageously results in a greater stability in comparison with separate elements.

For a reliable anchoring of the handle actuator in the handle, the handle actuator has a neck section, wherein the handle actuator has a multi-sided region on the handle end for obtaining a non-rotating connection therewith. The handle actuator also has a receiving space extending axially for receiving the drive pin actuator.

According to a preferred embodiment, the handle actuator is secured in the neck of the handle by a fastening means, e.g. a screw, wherein the handle actuator can also be connected in a materially bonded manner to the neck of the handle for conjoint rotation, e.g. with an adhesive. The neck region advantageously forms a contact surface. The non-rotating connection between the handle and the handle actuator is reinforced by the multi-sided region.

The receiving space in the handle actuator advantageously serves to receive the drive pin and/or the drive pin actuator such that it can be displaced longitudinally, wherein a limitation in the axial direction can be used as a stopping point for a spring. A drive pin and/or drive pin actuator placed in the receiving space can be tensioned with this spring in relation to the stop element. This pretensioning can be advantageously used as a counterforce against moving the handle from the first position to the second position. An external spring can preferably also be placed between the handle and the stop element, which tensions the handle in relation to the stop element. At the same time, the length of the drive pin that extends out of the stop element at the door or window end can varied as a result.

According to one development of the invention, the drive pin actuator can have at least one blocking recess for receiving the blocking element, wherein, according to one embodiment, the drive pin actuator has a first flange segment, wherein, according to one development, the blocking recesses are located in the first flange segment, wherein, according to one embodiment, the blocking recesses are located at the circumference in a circumferential surface of the first flange segment.

The blocking elements can be reliably brought into engagement with the drive pin actuator through the blocking recesses in the drive pin actuator, wherein the blocking recesses can be optimally coordinated to the sizes and dimensions of the blocking elements, in order to be able to reliably receive external forces or torques acting on the drive pin and/or the drive pin actuator.

The first flange segment of the drive pin actuator is preferably located on an end of the drive pin actuator facing the stop element, and is particularly preferably adjacent to a base or opening section of the stop element. A tilting of the drive pin and/or the drive pin actuator against the axis of rotation is further prevented advantageously by the flange segment of the drive pin actuator. This results in the advantage that the fitting can also be reliably actuated when subjected to heavy loads perpendicular to the axis of rotation. The placement of the blocking recesses in the flange segment is of further advantage because a radial direction of the retention torque of the blocking device when in the blocking position in relation to the axis of rotation becomes greater as the distance to the drive pin and/or the center of the drive pin actuator increases. The same applies blocking recesses located in the circumferential surface.

According to another advantageous embodiment, there is at least one recess in the flange segment, preferably on the surface facing the handle. This recess receives the handle actuator in a form-fitting manner, when the handle is moved from the first position to the second position, and the coupling element—comprising the handle actuator and the drive pin actuator—couples the handle to the drive pin. The recess is preferably closed at the base toward the stop element.

A significant development of the invention is that the actuating elements of the coupling element and/or the handle actuator engage in the blocking recesses in the drive pin actuator when the handle is in the second position. It is preferably also provided that the actuating elements are placed in a form-fitting manner in the blocking recesses in the drive pin actuator when the handle is in the second position, and that they particularly preferably close these recesses. In this case, the circumferential surface of the drive pin actuator is complemented when the handle is in the second position.

The engagement of the actuating element of the coupling element and/or the handle actuator in the blocking recesses of the drive pin actuator results in an unblocking of the blocking device in that the blocking elements are forced out of the drive pin or the drive pin actuator. In addition, due to the form-fitting engagement of the actuating elements in the blocking recesses, a form-fitting engagement is obtained, and thus a coupling that enables a reliable transference of torque from the handle to the drive pin. The two-part coupling element thus unblocks the blocking device when the handle reaches the second position, and simultaneously couples the handle to the drive pin.

Closing the blocking recesses also results in the advantage that the blocking recesses can no longer be brought into engagement with the blocking device when the handle is in the second position. Instead, a smooth outer surface is obtained on the drive pin actuator, which prevents a catching or clamping of the first flange segment with other elements of the fitting when it is rotated in the stop element.

The actuating elements preferably engage not only in the blocking recesses in the first flange segment of the drive pin actuator when the handle is in the second position. They also engage, preferably in a form-fitting manner, in the recesses in the flange segment of the drive pin actuator. As a result, the walls of the recesses and the lateral surfaces of the actuating elements also contribute to the transference of torque between the handle actuator and the drive pin actuator. This is of particular advantage when large forces must be transferred via the mechanism, as with large windows or doors that have numerous locking or bolting devices.

The engagement elements on the handle actuator also contribute to this, in particular when these are formed as an integral part of the actuating elements.

If the handle is in the first position, the handle actuator and drive pin actuator are not engaged, such that the blocking device prevents an unauthorized actuation of the drive pin.

According to one development of the invention, the drive pin actuator has a drive pin receiver, wherein this preferably has the same shape as the drive pin. It is also intended that the drive pin engages in the drive pin receiver.

In this manner, the handle actuator of the coupling element, or—when the coupling element has an integral design—the coupling element, can reliably be brought into engagement with the drive pin, i.e. a torque can be reliably transferred from the handle to the drive pin when the handle is in the second position.

The transference of torque can thus preferably take place via the drive pin receiver, which in particular has the same shape as the drive pin. This is furthermore advantageously obtained in that the drive pin engages in the drive pin receiver, preferably in a form-fitting manner. As a result, any play between the drive pin and the drive pin receiver, and via the transfer of torque by the coupling element between the handle and the drive pin, is effectively prevented.

In another embodiment, the drive pin actuator has a neck section, wherein the neck section is preferably closed at the handle end, and a spring is located between the closure and the drive pin.

Providing the neck section has the advantage that the drive pin actuator is guided over a longer distance with its neck section in the receiving space of the neck section of the handle actuator. This axial guidance along the axis of rotation contributes to a torsional stiffness of the fitting, and in particular the drive element of the mechanism located in the fitting. Furthermore, the neck section is advantageous when the drive pin actuator can be slid axially on the drive pin in relation to the axis of rotation, and/or the drive pin can be slid axially in the drive pin receiver in relation to the axis of rotation. As a result, the neck section of the drive pin actuator forms a guide with the handle actuator extending along the axis of rotation in the axial direction. In this context, the spring loading or pre-tensioning of the drive pin actuator and/or the drive pin is advantageous, because the drive pin can thus be adapted to different installation depths.

According to one embodiment, the drive pin actuator has a second flange segment, wherein according to one development, the second flange segment adjoins the first flange segment at the handle.

The second flange segment is advantageous because it increases the torsional stability of the drive pin actuator. In particular, the drive pin actuator must accommodate the forces applied when the blocking device is in the blocking position if there is an unauthorized actuation of the closing mechanism via one or more locking elements of the window sash or door panel, and it cannot fail mechanically, because otherwise the mechanism is released for actuating the remaining locking elements.

According to another aspect of the invention, there is at least one latching depression for at least one latching element in the second flange segment or the first flange segment on the circumference, wherein the latching element is preferably located in the stop element. In one embodiment, the latching element is pretensioned radially against the first flange segment or the second flange segment of the drive pin actuator by a latching element spring.

The latching element and latching depression are advantageous because latching positions can be generated by actuating the handle. In particular, latching positions at 90° to 180° to the first handle position that are obtained when the handle is rotated about the axis of rotation are advantageous because various states, such as a tilted position or an open position, are indicated haptically to the user that relate to the functioning of the door panel or the window sash. The latching elements can advantageously be placed in the stop element, such that this arrangement saves space.

In another aspect of the invention, the handle actuator has at least one positioning web, wherein the positioning web is located at the handle side on the flange segment, and the stop element particularly preferably has at least one positioning pocket for the positioning web. In another aspect, the positioning web can be brought into engagement with the positioning pocket when the handle is in the first position.

Because of the positioning web, the handle can be advantageously positioned and secured in a defined position via the handle actuator that is connected to the handle for conjoint rotation. In particular, the arrangement of the positioning web on the side of the flange segment of the handle actuator facing the handle can be advantageously obtained because in this manner, an engagement, e.g. with the stationary stop element, can be obtained via the positioning pockets.

In one development of the invention, the stop element has a reinforcement that rests in the stop element and has at least one recess lying in the region where the positioning web engages with the positioning pocket.

The reinforcement preferably absorbs forces that arise when the handle is rotated about the axis of rotation. The recesses are particularly preferably arranged around the positioning pockets, such that forces acting against the engagement of the positioning webs with the positioning pockets are deflected to the reinforcement, and the stop element is substantially prevented from receiving these forces. As a result, the stop element can be made of less mechanically robust materials or in a particularly space-saving manner. The reinforcement is preferably made of metal and is preferably in the form of a plate.

According to another embodiment of the invention, the positioning webs are disengaged from the respective positioning pockets when the handle is in the second position.

As a result, the handle cannot rotate about the axis of rotation when it is in the first position in which the coupling element is not coupled to it. The handle thus has no functional connection to the mechanism via the drive pin.

This positioning of the handle has the advantage that the handle cannot move freely when in the first position. An axial movement of the handle in the second position along the axis of rotation disengages the positioning webs from the positioning pockets. The distance required to disengage the positioning webs from the positioning pockets is as long as the distance necessary for engaging the actuating elements and/or engagement elements with the recesses and/or the blocking recesses. In this manner, the handle is prevented from assuming an undefined position prior to and during the actuation.

Furthermore, the handle is preferably always in the second position when the handle is rotated about the axis of rotation. This can be obtained by a corresponding placement of the positioning webs and the positioning pockets in different angular positions in relation to the axis of rotation of the handle.

In an alternative embodiment, the handle can be moved to a latched position, which can be at 90° for the open position of a window sash or a door panel, or 180°, e.g., for the tilted position of a window sash and/or a door, through a corresponding movement of the handle to the first position. In this manner, the actuating elements are also disengaged from the blocking device in these positions, and the handle must then be moved axially along the axis of rotation and subsequently rotated in order to actuate the mechanism. This complication is of particular advantage when it is intended for the operation of the handle to be more difficult.

Further, the handle can have a locking device in one embodiment, for securing it axially, wherein in one development, the locking device has a lock cylinder with a locking element. This can be a bolt, for example, which bears on the stop element in a locking position and keeps the handle in the first position. In one embodiment, the locking device has a locking slide, which places the locking element in a locking position between the handle actuator and the drive pin actuator, and keeps the handle in the first position.

Locking devices have the advantage that in addition to the two handle positions, actuation of the fitting by unauthorized parties from the inside is made more difficult by the locking slide, and can be substantially prevented if there is a lock.

Further features, details and advantages of the invention can be derived from the wording of the claims and the following description of exemplary embodiments in reference to the drawings. Therein:

Figure 4:
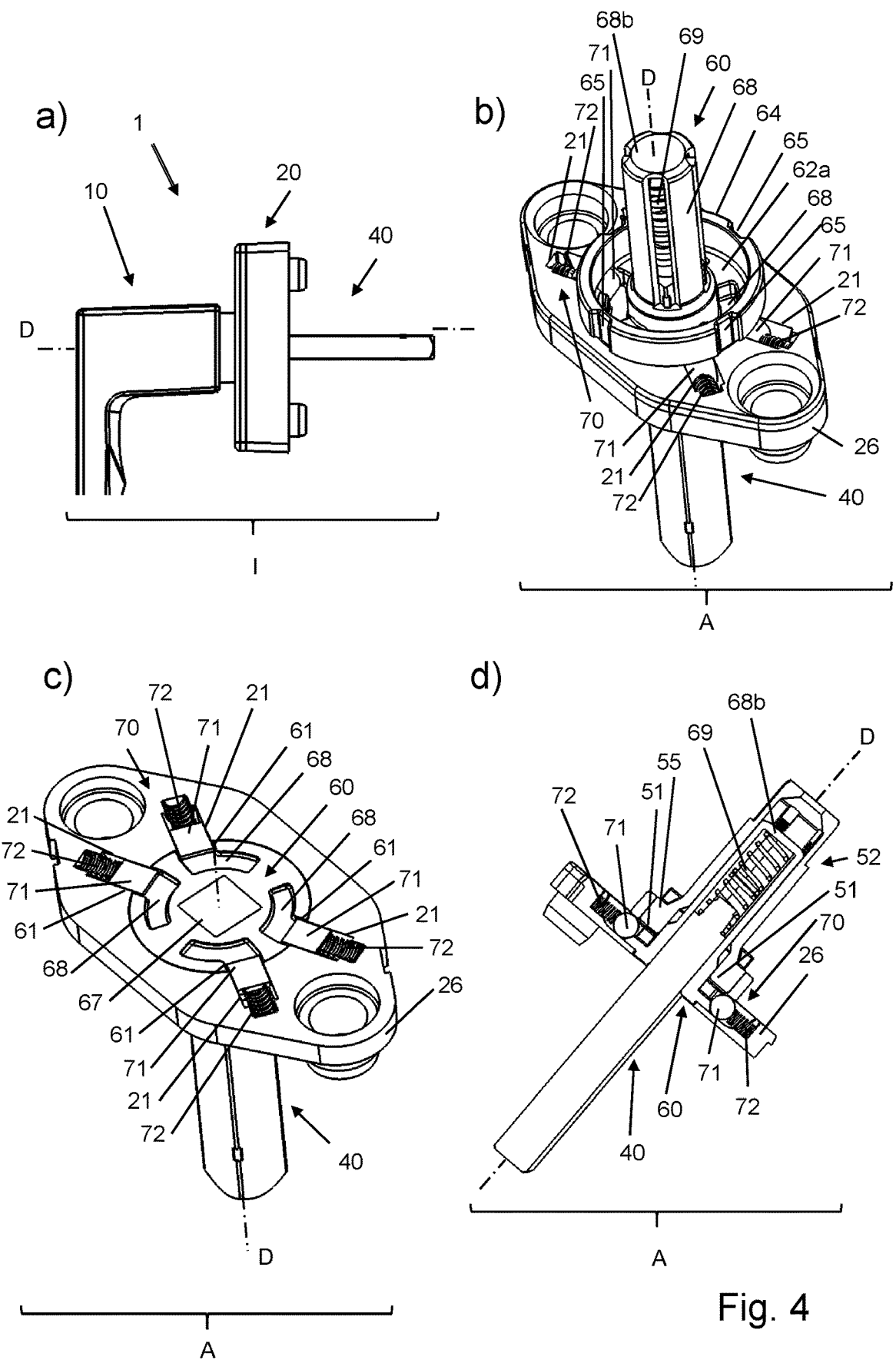
Figure 5:
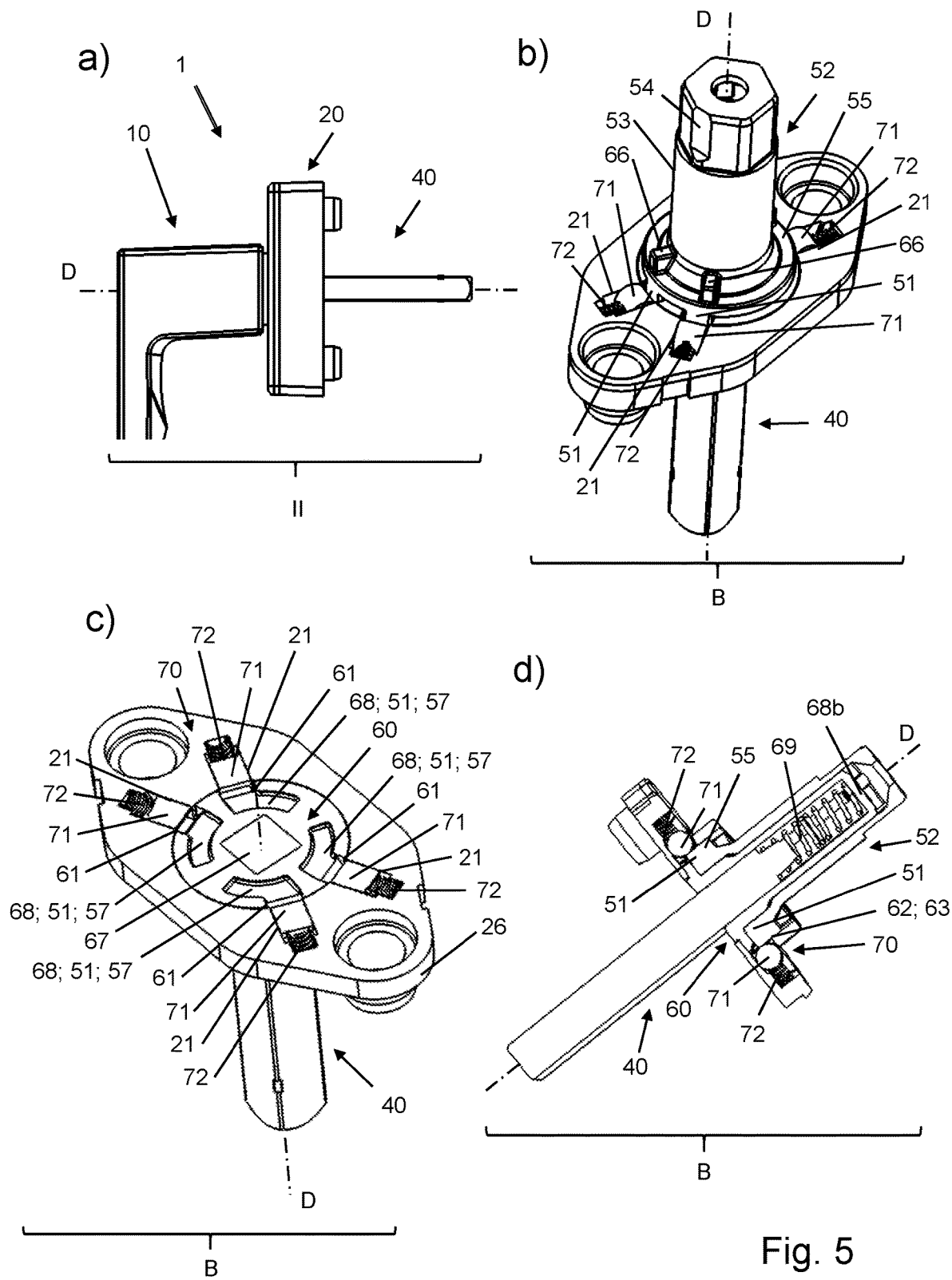
Figure 6:
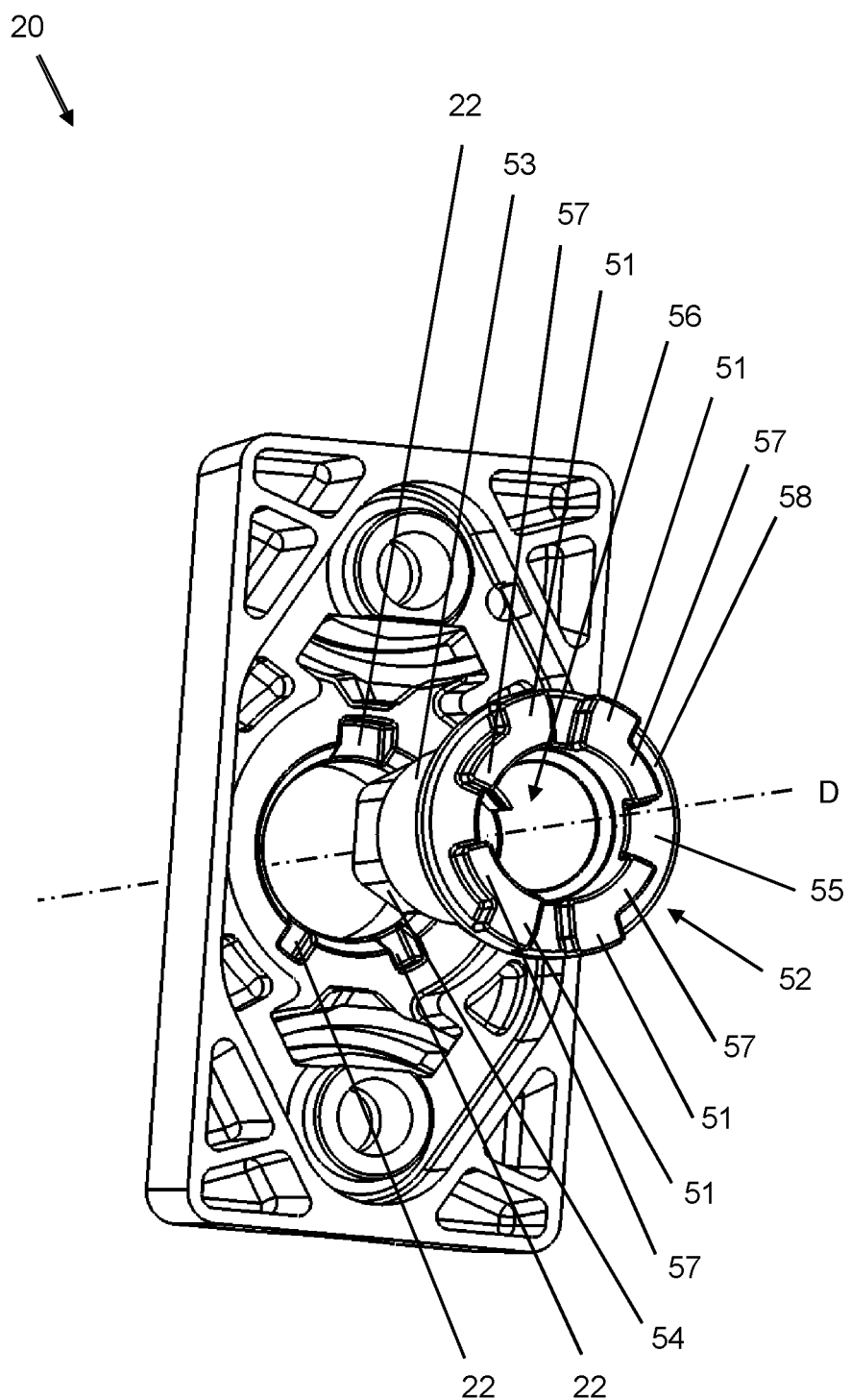
Figure 7:
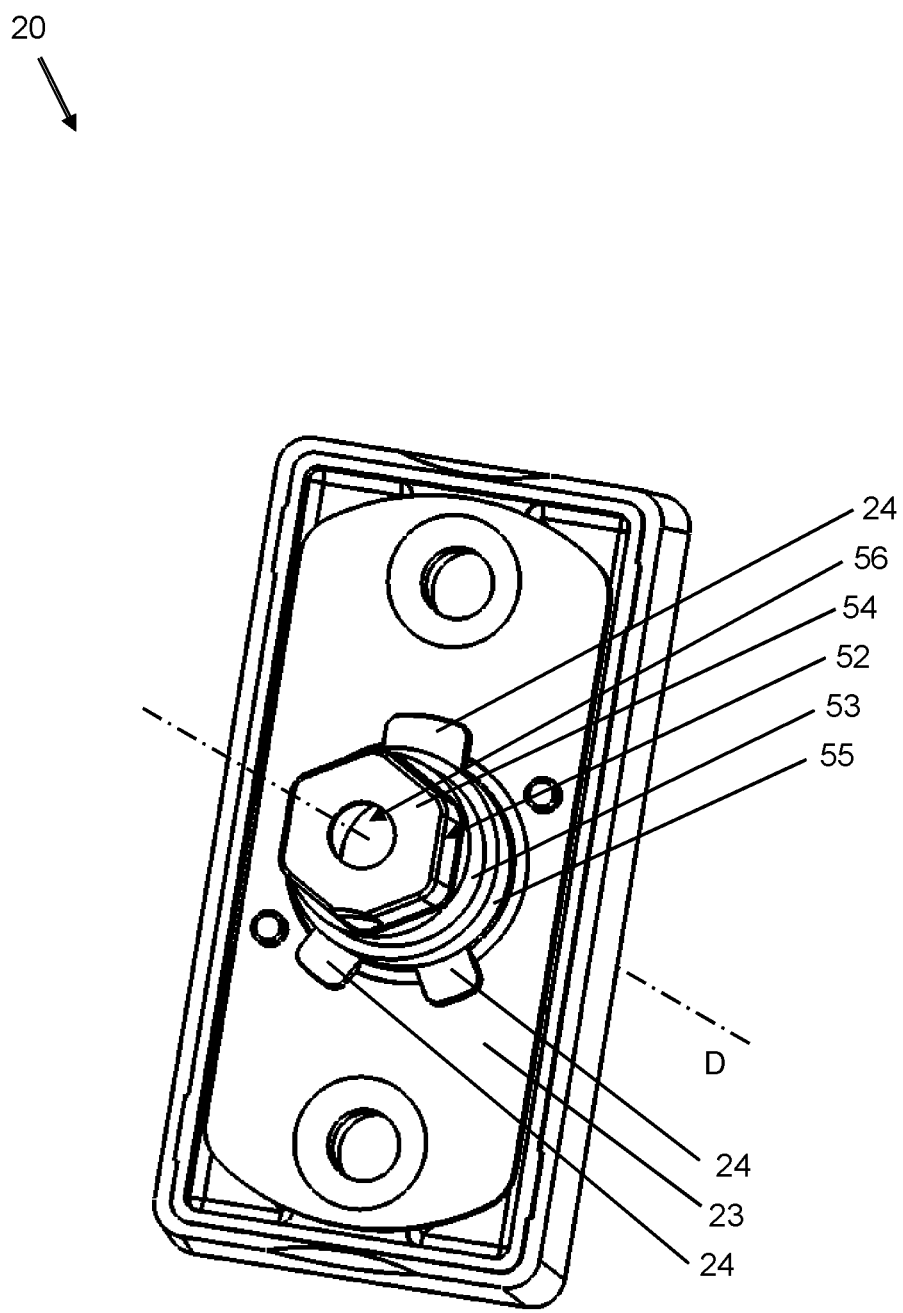
Figure 8:
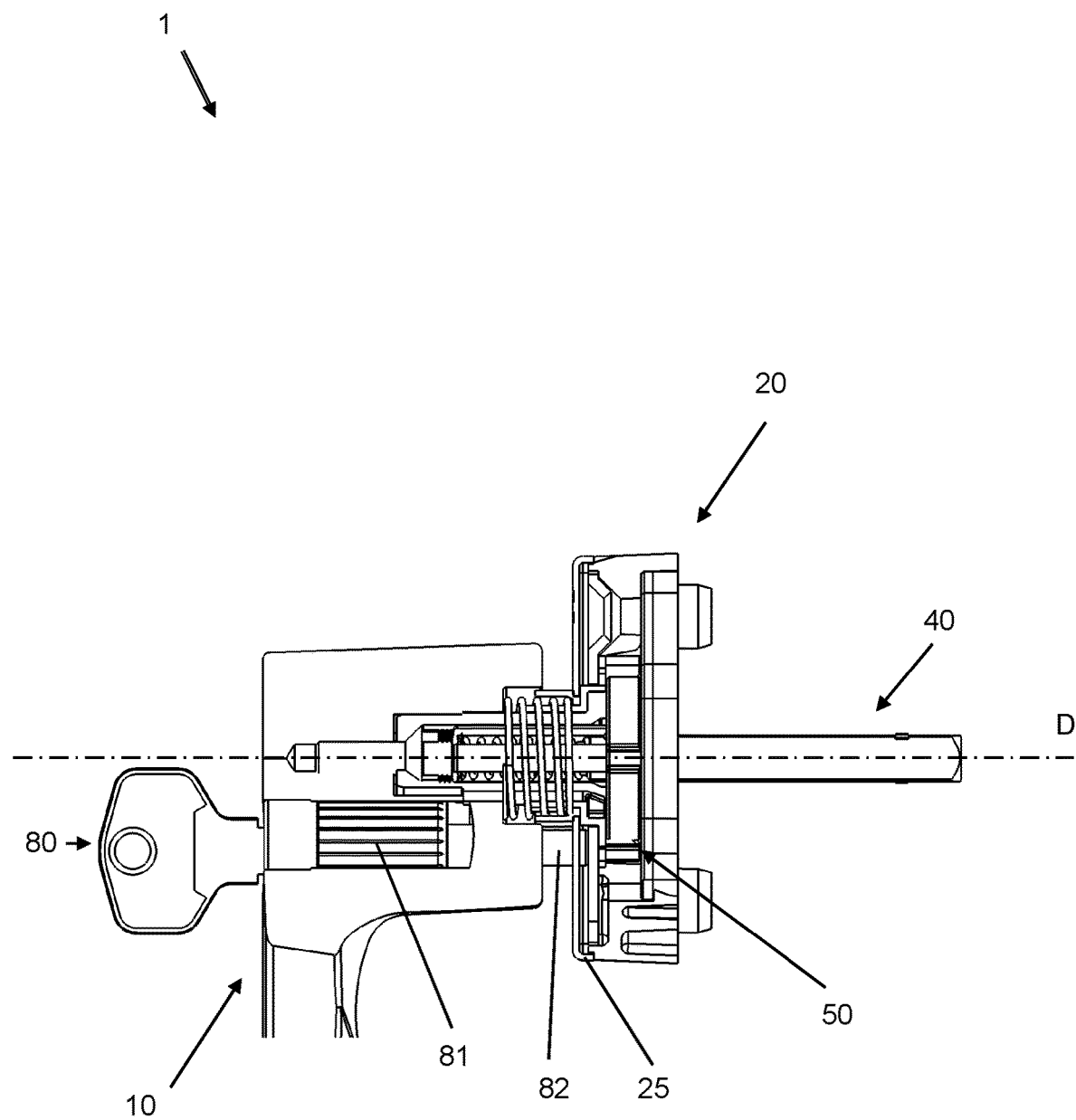
Figure 9:
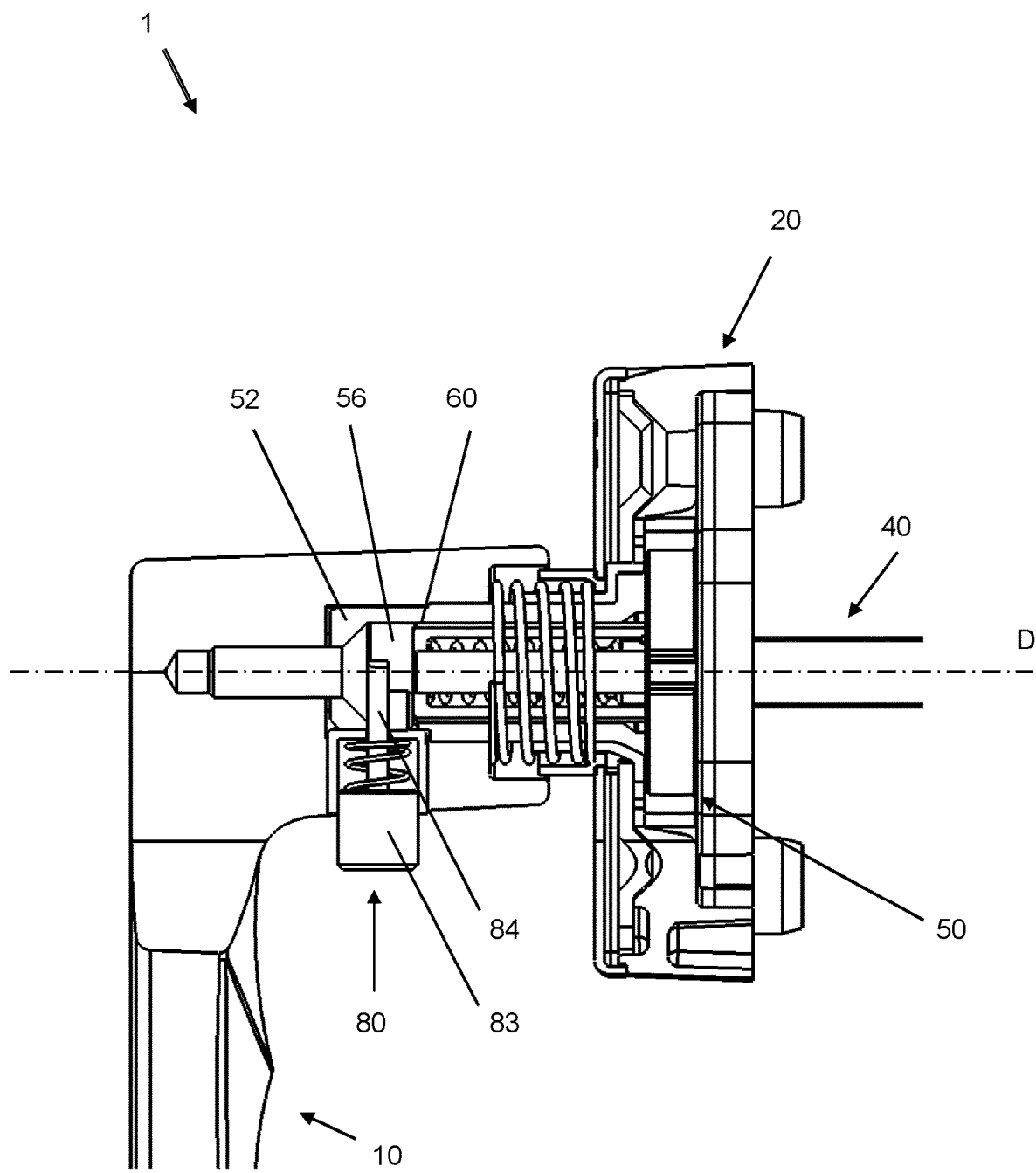
Figure 10:
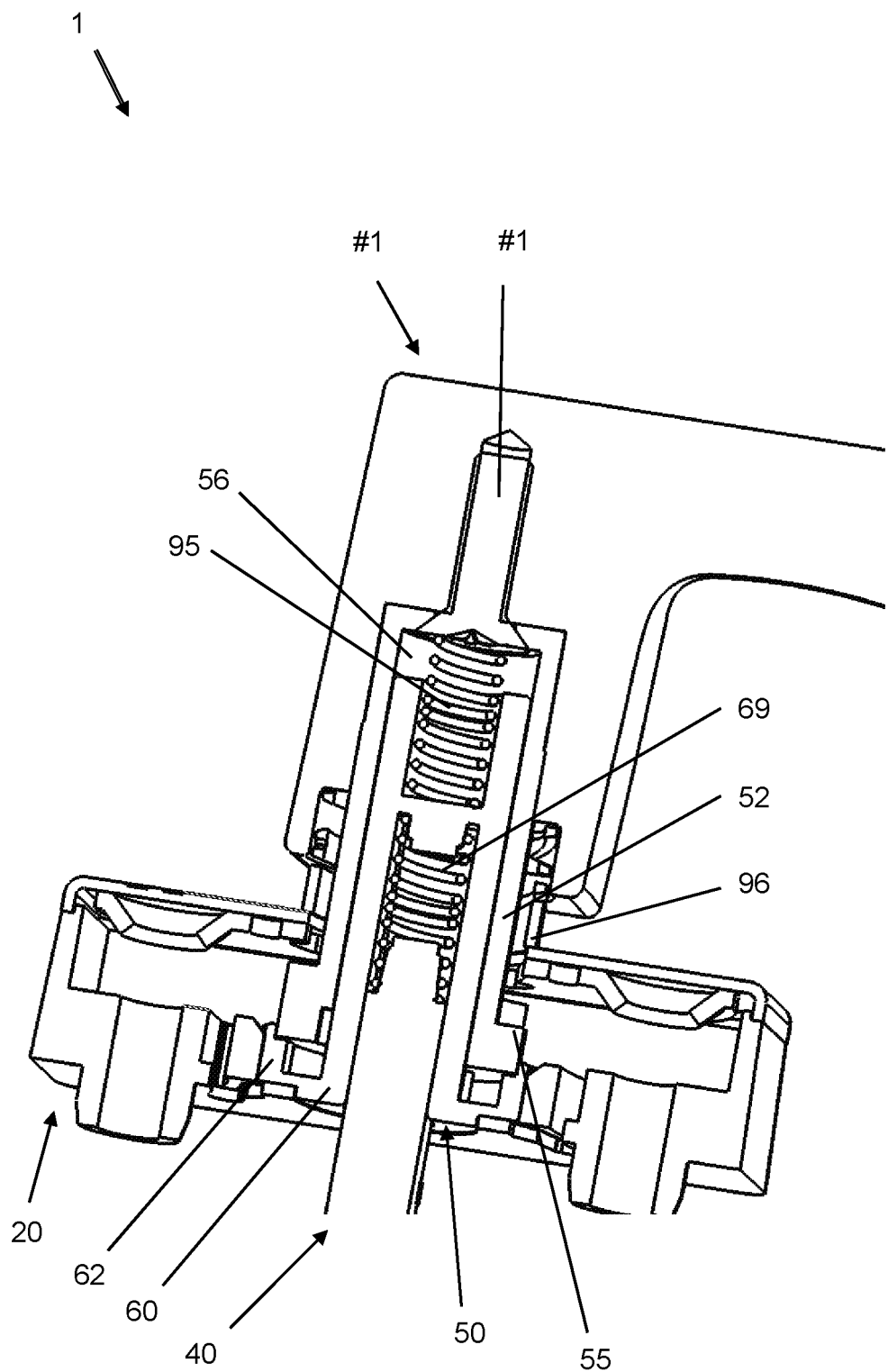
Figure 11:
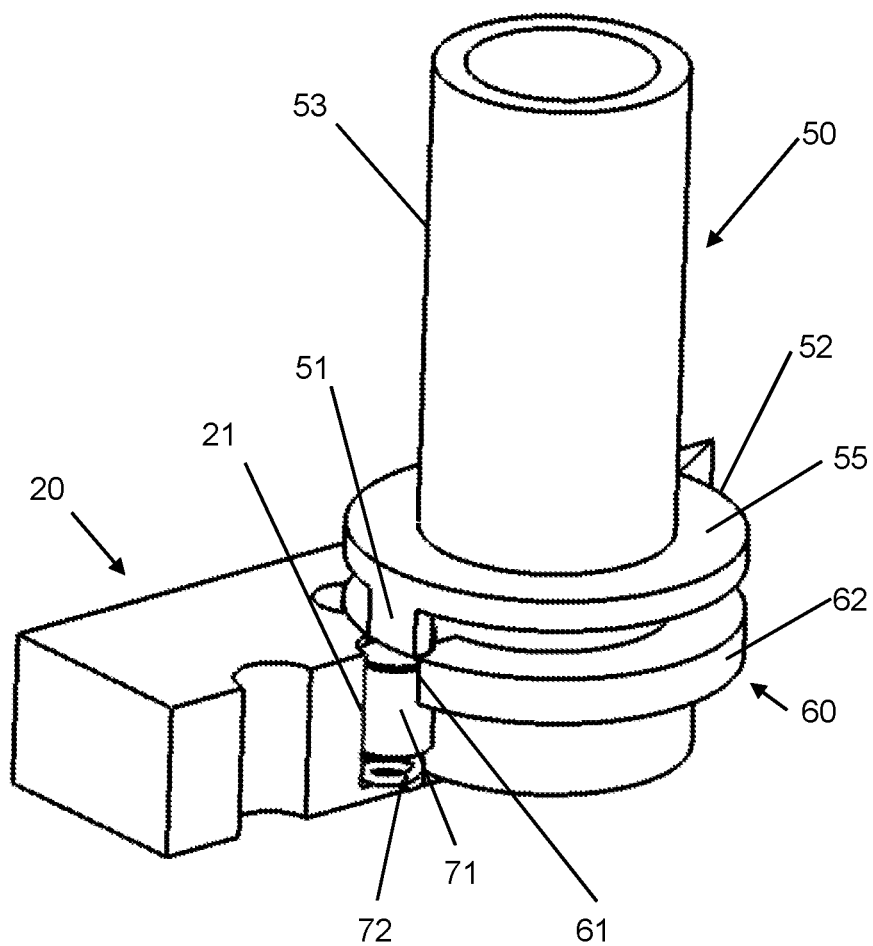
Figure 12:
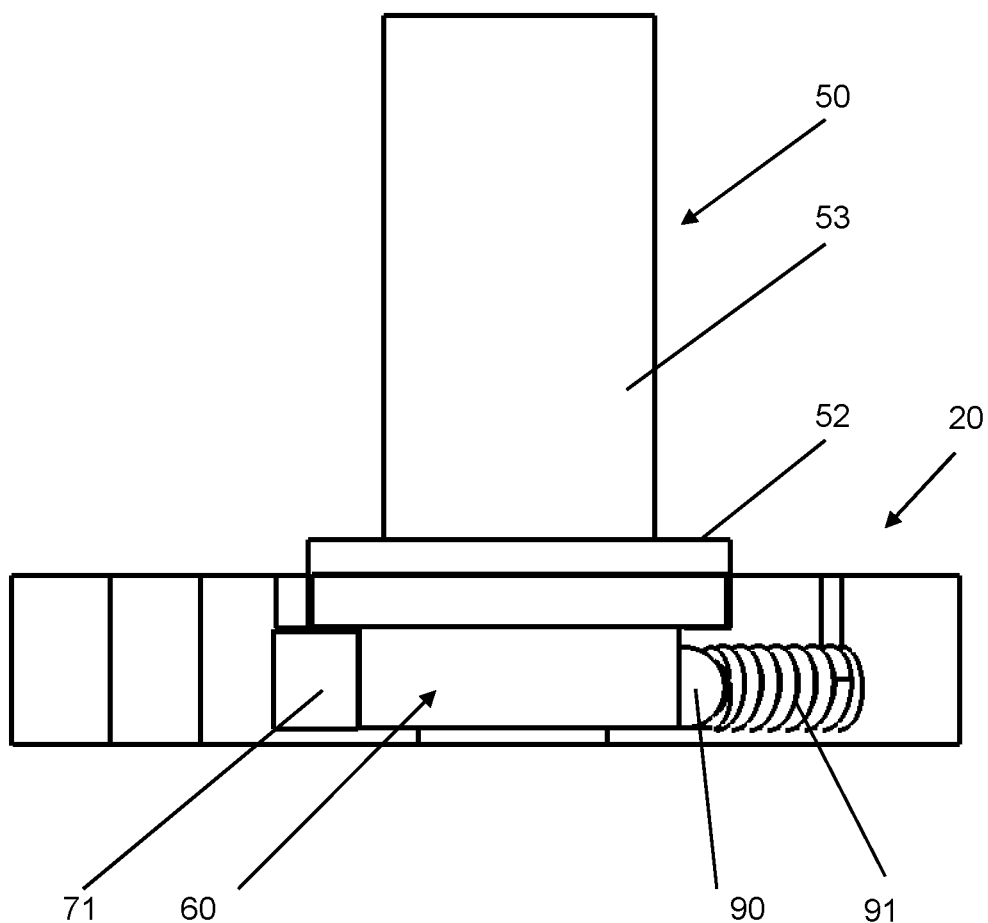
Figure 13:
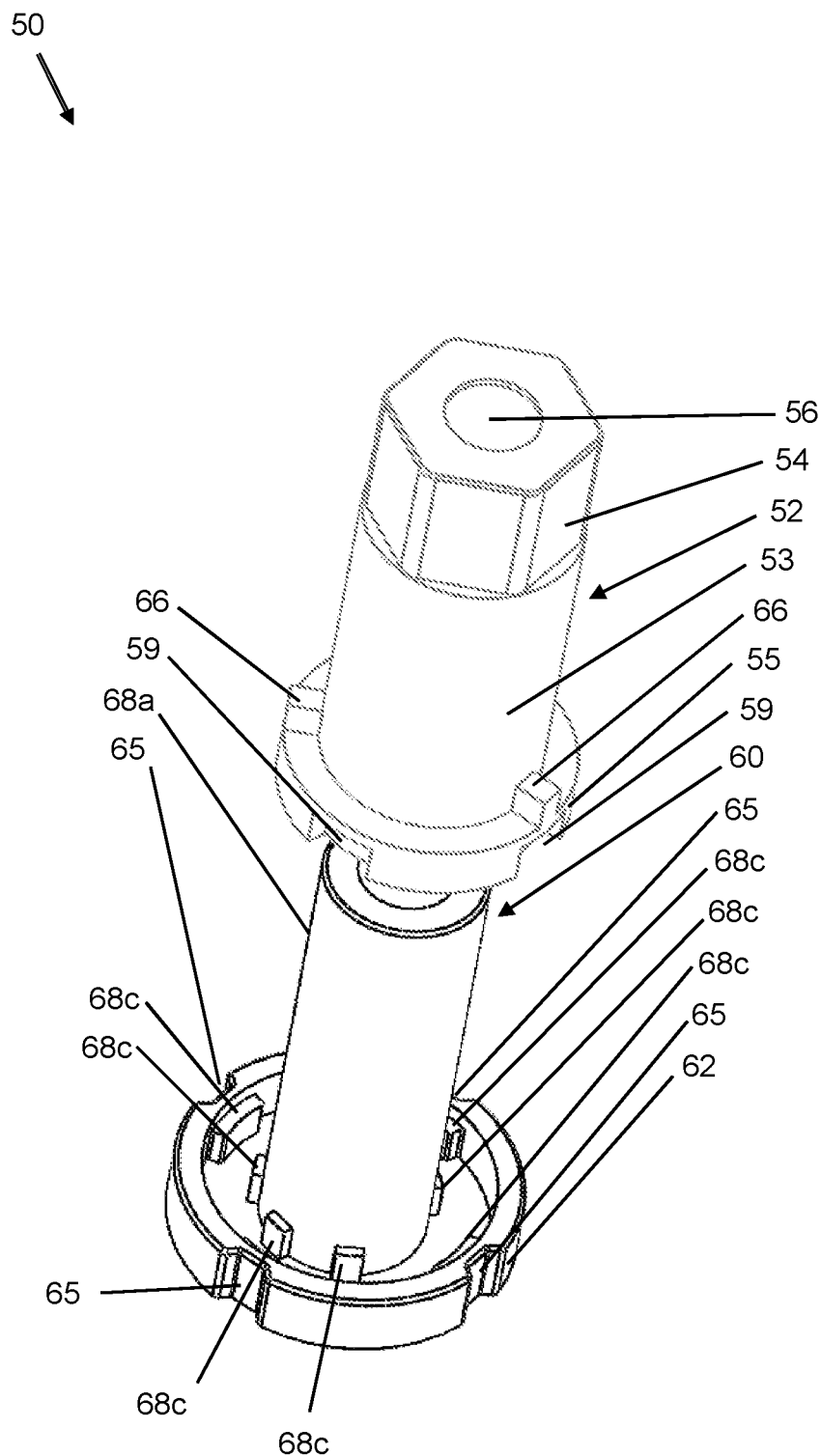
Figure 14:
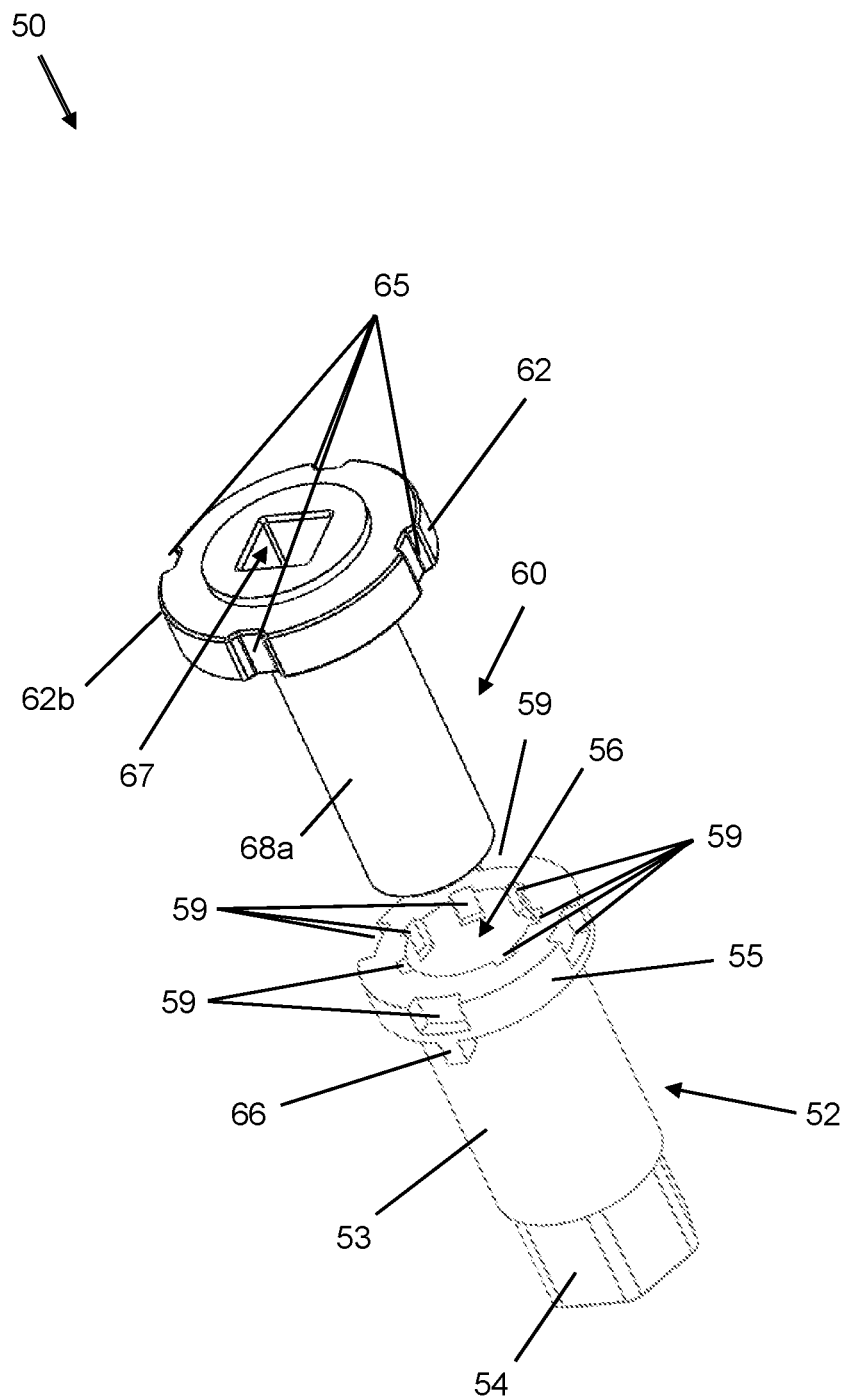

FIGS. 4 *a*)-*d*) show a perspective and partially cutaway schematic illustration of an embodiment of a fitting in a blocking position;

FIGS. 5 *a*)-*d*) show a perspective and partially cutaway schematic illustration of an embodiment of a fitting in a window sash;

FIG. 6 shows a perspective schematic exploded view of an embodiment of a stop element with a handle actuator;

FIG. 7 shows a perspective schematic illustration of another embodiment of a stop element with a handle actuator;

FIG. 8 shows a cutaway schematic illustration of an embodiment of a fitting with a lock;

FIG. 9 shows a cutaway schematic illustration of an embodiment of a fitting with a locking slide;

FIG. 10 shows a cutaway perspective schematic illustration of an embodiment of a fitting;

FIG. 11 shows a partially cutaway perspective schematic illustration of an embodiment of a fitting with a coupling element and a locking device;

FIG. 12 shows a cutaway schematic illustration of an embodiment of a fitting with a coupling element and a locking device;

FIG. 13 shows a perspective schematic illustration of an embodiment of a coupling element for a fitting; and FIG. 14 shows a perspective schematic illustration of an embodiment of a coupling element for a fitting.

Figure 1:
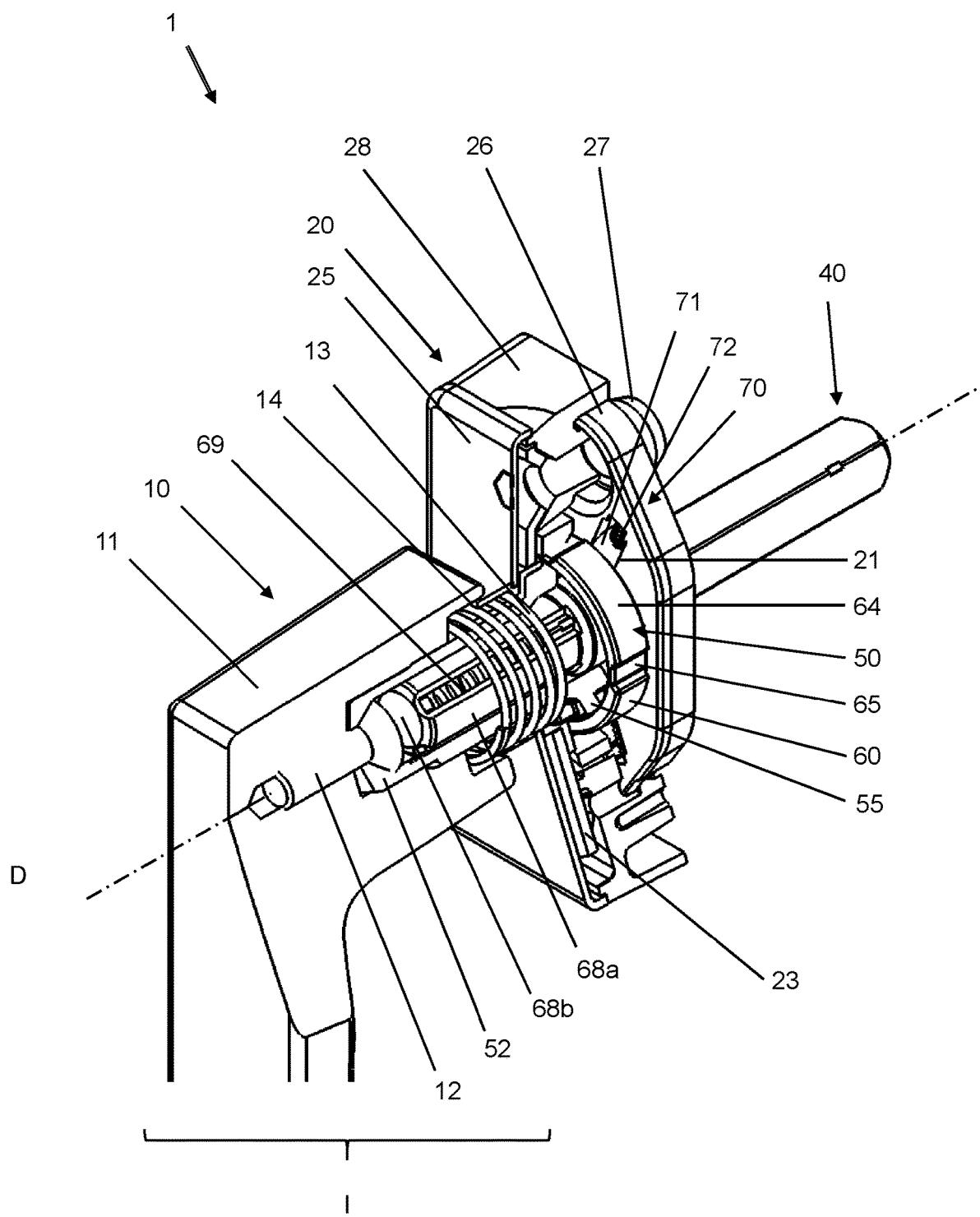
FIG. 1 shows a partially cutaway, perspective schematic illustration of an embodiment of a fitting, e.g. for a door panel, a window sash, etc.

FIG. 1 shows a partially cutaway perspective schematic illustration of an embodiment of a fitting 1, e.g. for a door panel, a window sash, etc. The elements of the fitting 1 are located along an axis of rotation D, which defines an axial direction. A radial direction runs perpendicular to the axial direction, thus perpendicular to the axis of rotation D.

A handle has a neck 11 in which a handle actuator 53 is received such that it rotates conjointly therewith and is axially fixed in place. A drive pin actuator 60 is located in a receiving space 56 in the handle actuator 53, which receives a drive pin 40. The drive pin 40 passes through a stop element 20 and is connected to a mechanism, not shown, which actuates a locking mechanism in a window or a door.

The drive pin actuator 60 has a second flange segment 64, which is located in front of a base insert 26 of the stop element 20 in the axial direction, inside the stop element 20 on the handle end. The drive pin actuator 60 also has a first flange segment 62 (not visible in FIG. 1), which extends into the base insert 26.

The drive pin actuator 60 also has a neck section 68a, which is delimited at the handle side by a closure 68b. There is a spring 69 inside the neck section 68a, which pretensions the drive pin 40 toward the stop element 20. This is of particular advantage when the installation depth of the drive pin 40 is not known or an installation depth dictated by the door panel or the window sash has to be accommodated for.

The base insert 26 of the stop element 20 also has recesses 21 for blocking elements 71 and springs 72 of a blocking device 70. The blocking elements 71 can be brought into engagement with the first flange segment 62 of the drive pin actuator 60. The function of the blocking device 70 shall be explained below in reference to FIGS. 4 and 5.

Cams 27 are formed in the base insert 26, which can be brought into engagement with corresponding recesses in the window or door. The base insert 26 is tensioned against a base element 28 of the stop element 20 by a securing means (not shown).

A reinforcement is located between the base element 28 and the cover plate 25, the function of which shall be explained below in reference to FIG. 7.

The handle actuator 52 and the drive pin actuator 60 collectively form the coupling element 50, wherein a torque can be transferred from the handle 10 to the drive pin 40 through the coupling element 50.

The handle actuator 52 and the drive pin actuator 60 can be slide axially against one another along the axis of rotation D, wherein the handle 10 can be brought by this means into a first position I and a second position II (not shown). In the first position I, the handle 10 is at a radial distance to the stop element 20 in this exemplary embodiment, which is greater than when the handle is in the second position II (not shown).

The handle 10 is in the first position I when the window or door is closed. The return spring 13 located on the outside of the handle actuator 52, which engages in a receiving space 14 in the handle, tensions the handle 10 against the stop element 20 such that the handle 10 is pushed into the first position I. At the same time, the return spring 13 bears on a cover plate 25 of the receiving element, wherein the cover plate is pressed by the tension of the spring 13 against the stop element 20, in particular against the base element 28 of the stop element 20.

In order to secure the handle actuator 52 in the handle neck 11, there is a fastening means 12, formed by a screw in this exemplary embodiment, which extends through a multi-sided region 54 of the handle actuator 52 at the handle side, and into the handle neck 11 of the handle 10. Alternatively, the fastening of the handle actuator 52 in the handle can also take place with a material bonded connection, e.g. using adhesive.

Figure 2:
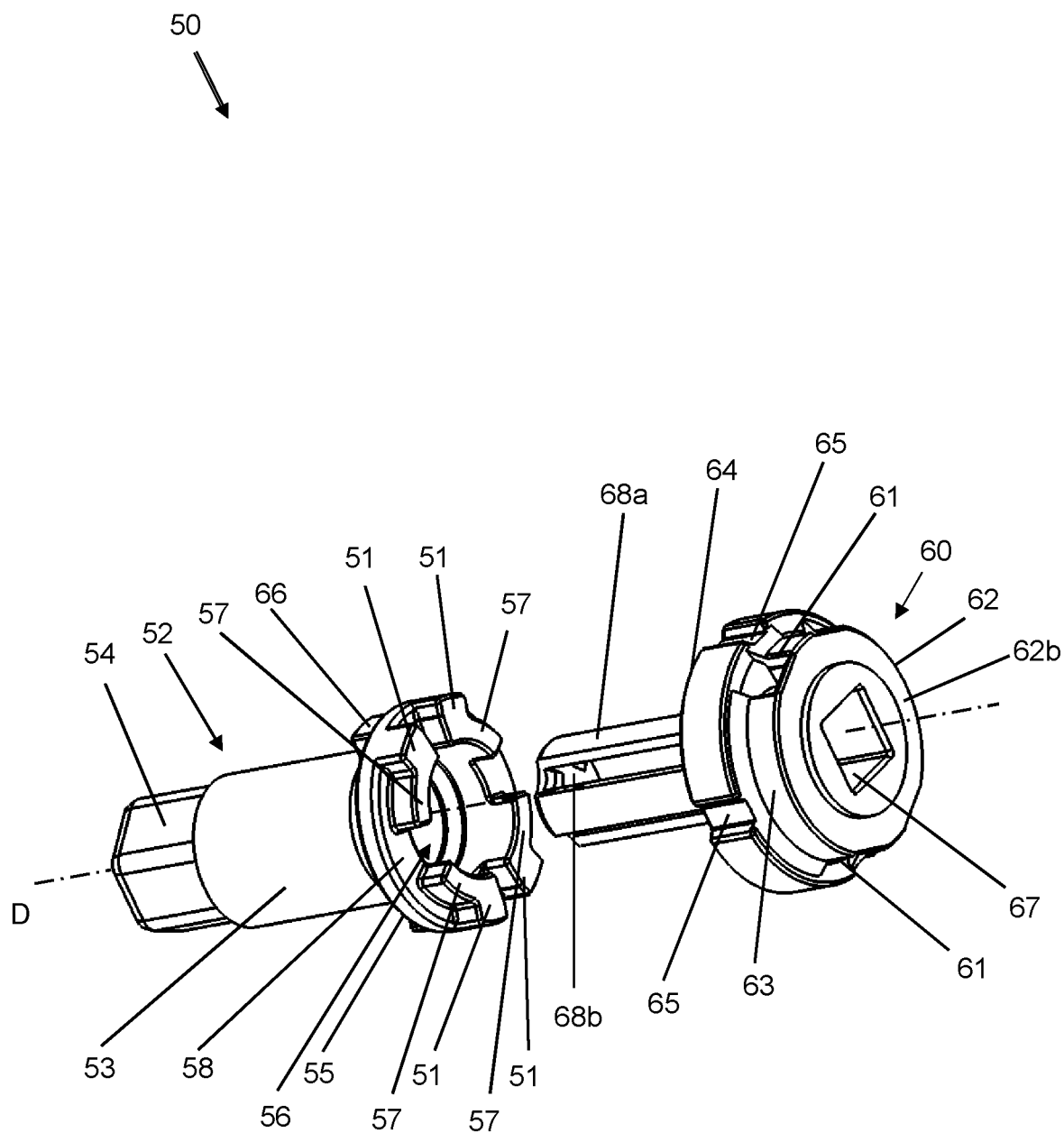
FIG. 2 shows a perspective, schematic illustration of an embodiment of a coupling element for a fitting.

FIG. 2 shows a perspective schematic illustration of an embodiment of a coupling element 50 for a fitting 1 with a detailed illustration of the handle actuator 52 and the drive pin actuator 60.

The handle actuator 52 can be placed in the neck 11 of the handle 10, as described above, and can be secured there for conjoint rotation by a fastening means 12. For this, the handle actuator 52 also has a multi-sided region 54 at its end where the handle is. The multi-sided region 54 can engage in a corresponding recess in the handle, such that a rotation of the handle about the axis of rotation D is prevented.

The handle actuator 52 also has neck section 53 that is substantially cylindrical. This neck section 53 adjoins the multi-sided region 54 toward the drive pin actuator 60. The neck section 53 is in the shape of a tube and has a receiving space 56 in which the drive pin actuator 60 can be at least partially received, for example.

There is a flange segment 55 on an end of the handle actuator 52 facing the drive pin actuator 60, wherein the flange segment 55 is formed by a flange and extends radially, perpendicular to the axis of rotation D. Positioning webs 66 are located on the flange segment 55 of the handle actuator 52 on the handle side, which can engage in positioning pockets in the base element 28, as shall be explained below in reference to FIGS. 6 and 7.

Actuating elements 51 and engagement elements 57 are located on the side of the handle actuator 52 facing the drive pin actuator 60. In particular, there are four engagement elements 57 on the flange segment 55 that extend along the circumference of the flange segment 55, and are spaced apart along the circumference.

The engagement elements 57 extend radially outward from an inner surface of the flange segment 55 formed by the receiving space 56, although the engagement elements 57 do not extend over the entire radius of the flange segment 55.

The actuating elements 51 are located on ends of the engagement elements 57 lying on the circumference, and extend to a radial outer end of the flange segment 55.

The actuating elements 51 are formed integrally with the engagement elements 55 and extend circumferentially along the flange segment 55 over a smaller region than the engagement elements 51.

The drive pin actuator 60 has a closure 68b on an end facing the handle actuator 52, to which a neck section 68a, a first flange segment 62 and a second flange segment 64 are adjoined in the direction of the end of the drive pin actuator 60 facing away from the handle actuator. An end surface 62b closes the drive pin actuator 60 at the end lying opposite the handle actuator 52.

The neck section 68a of the drive pin actuator is substantially cylindrical and hollow on the inside, such that a drive pin receiver 67 is formed inside the neck section 68a and inside the first flange segment 62 and the second flange segment 64.

The neck section 68a also has numerous slots in its outer circumference, parallel to the axis of rotation D. This is of particular advantage when the drive pin 40 has a square cross section. The edges of the drive pin can engage in the slots in the outer circumference of the neck section 68a. This saves space and results in an improved torque transfer between the drive pin actuator 60 and the drive pin 40.

Latching depressions 65 are located in the second flange segment 64 along its outer circumference, the function of which shall be explained below. The first flange segment 62 has blocking recesses 61, which are arranged and dimensioned such that the actuating elements 51 can be brought into engagement with the blocking recesses 61 in a form-fitting manner.

The radially outer edges of the actuating elements 61 of the handle actuator 52 complement the circumferential surface of the first flange segment 62 of the drive pin actuator 60 in the exemplary embodiment when the flange segment 55 of the handle actuator 52 is pushed into the flange segment 62 of the drive pin actuator 60.

The flange segment 55 of the handle actuator 52 has an outer diameter that is smaller than or equal to the inner diameter available in the first flange segment 62 of the drive pin actuator 60.

Figure 3:
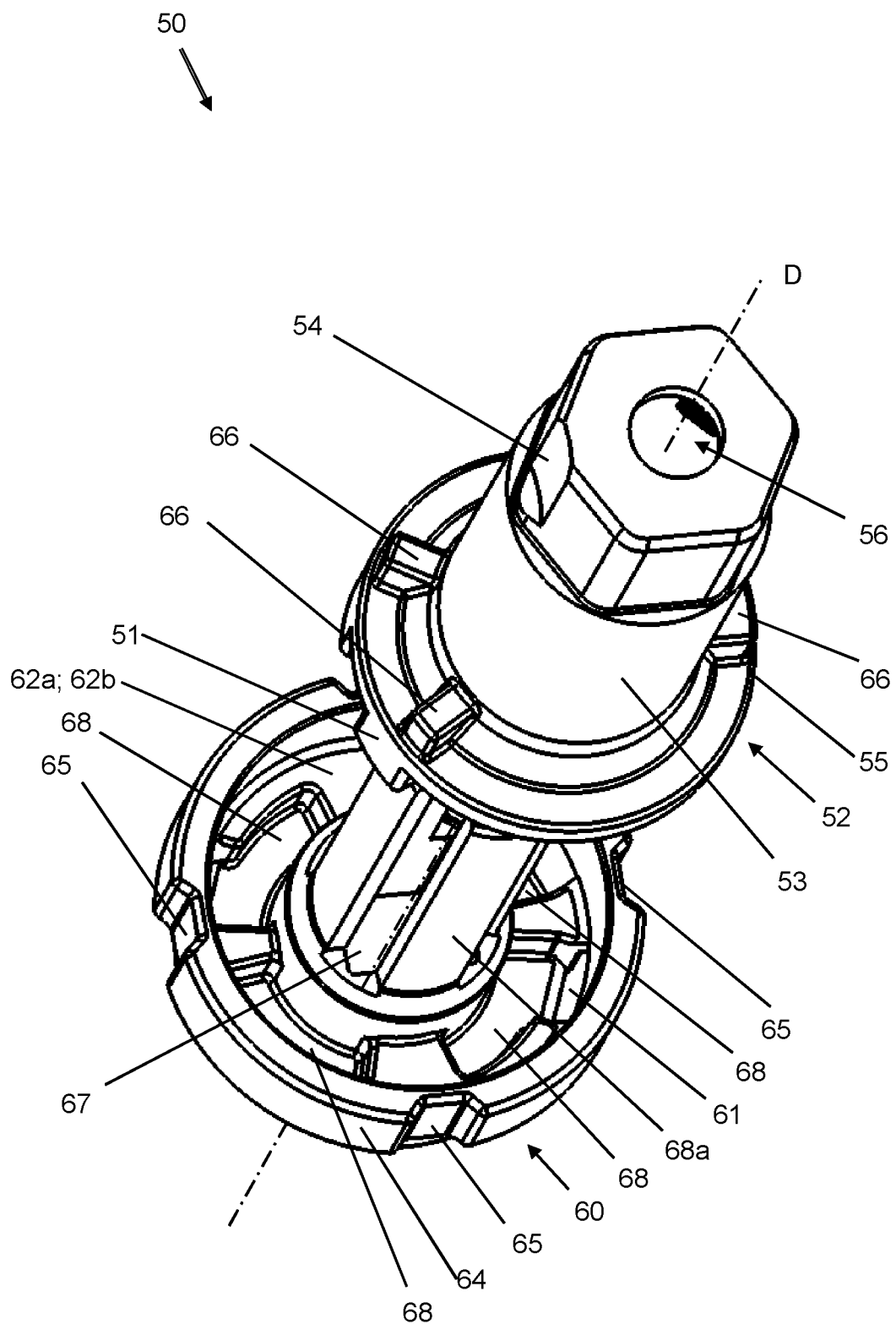
FIG. 3 shows a further perspective schematic illustration of an embodiment of a coupling element for a fitting.

FIG. 3 shows a perspective schematic illustration of another embodiment of a coupling element 50 for a fitting 1, wherein the handle actuator 52 and the drive pin actuator 60 from FIG. 2 are shown therein.

The multi-sided region 54 of the handle actuator 52 has a hole for the fastening means 12.

The positioning webs 66 located on the surface of the flange segment 55 of the handle actuator 52 at the handle side can be readily seen in FIG. 3. There are three positioning webs 66 located on the flange segment 55, which extend in a Y-like configuration from the radial outer edge region of the flange segment 55 to the neck section 53 of the handle actuator 52.

The drive pin actuator 60 has a surface 62*a* of an end surface 62*b* facing the stop element 20 oriented toward the handle, in which the recesses 68 are located.

The recesses 68 can be brought into a form-fitting engagement with the engagement elements 57 and the actuating elements 51. The recesses exhibit a negative form of the engagement elements 57 and actuating elements 51 described above.

The first flange segment 62 has a blocking recess 61 in its circumferential surface 63 in the region in which the actuating elements 51 of the handle actuator 52 engage with the first flange segment 62 of the drive pin actuator 60.

When the handle actuator 52 is slid onto the neck section 68*a* of the drive pin actuator 60 such that the neck section 68*a* of the drive pin actuator 60 is pushed into the receiving space 56 of the handle actuator 52, the engagement elements 57 engage in the recesses 68. In addition, the actuating elements 51 engage with the recesses 68 and the blocking recesses 61, and the flange segment 55 of the handle actuator 52 engages with the flange segment 55 of the drive pin actuator.

In the engaged position in the second position II of the handle (not shown in FIG. 3), the handle actuator 52 is connected to the drive pin actuator 60 for conjoint rotation. They are coupled to one another.

The coupling element 50 couples the handle 10 to the drive pin 40 in this state. The blocking recesses 61 are also complemented in this state, such that the circumferential surface 63 of the first flange segment 62 is substantially continuous.

FIGS. 4 *a*)-*d*) show perspective and partially cutaway schematic illustrations of an embodiment 50 of a fitting 1 in a blocking position A, wherein the handle 10 is in the first position I.

FIG. 4 *a*) shows a side view of the fitting with the handle 10, the stop element 20, and the drive pin 40 with the handle in the first position I, wherein the handle 10 is at a distance to the stop element 20 along the axis of rotation D when the handle is in this first position I, which is greater than the distance when the handle is in the second position II (cf. FIG. 5*a*)).

FIG. 4 *b*) shows a perspective, partial illustration of the fitting with the drive pin 40, the base insert 26 of the stop element 20, the blocking device 70, and the drive pin actuator 60.

In the first position I of the handle, the handle actuator 52 is not engaged with the drive pin actuator 60, such that the handle 10 is not coupled to the drive pin 40. For this reason, the handle actuator 52 is not shown in FIGS. 4 *b*) and *c*).

The blocking device 70 is in the blocking position A. The blocking elements 71 of the blocking device 70 inserted in the recesses 21 are engaged with the blocking recesses 61 in the first flange segment 62 of the drive pin actuator 60 through the tension applied to them by means of the spring 72.

The blocking elements 71 are in the form of rollers guided by the boundaries of the recesses 21. An alternative embodiment of the blocking elements 71, e.g. as balls or bolts, is also a possibility.

The first flange segment 62 is non-rotatably connected to the stop element 20, such that it cannot rotate about the axis of rotation D, through the engagement of the blocking elements 71 with the first flange segment 62 of the drive pin actuator 60.

The drive pin 40 received in the drive pin receiver 60 is thus also non-rotatably supported in the blocking position A and the first handle position I. The drive pin 40 can also be displaced axially in the drive pin receiver 60, e.g. when there is a gap, or a spring 69 is located, in the drive pin receiver 67 between the drive pin 40 and the closure 68*b*.

The second flange segment 64, with the latching depressions 65 located in its circumference, bears on the base insert 26 when the handle is in the first position I.

FIG. 4 *c*) shows a section through the base insert 26, the blocking device 70, the drive pin actuator 60 in the region of the first flange segment 62, and the drive pin 40 that has been placed in the drive pin receiver 67 in the drive pin actuator 60, cut along a cutting plane perpendicular to the axis of rotation D. Furthermore, the actuating elements 51 are disengaged from the recesses 68 and the blocking recesses 61, such that the recesses 68 and the blocking recesses 61 are only partially filled through the engagement of the blocking elements 71 in the blocking position A.

Furthermore, it can be clearly seen that, in the blocking position A, the blocking elements 71 of the blocking device 70 are engaged in the blocking recesses 61 in the drive pin actuator 60. The spring load to the blocking elements 71 caused by the springs 72 ensures that the blocking elements 71 are tensioned radially inward into the recesses 21 in the base insert 78, perpendicular to the axis of rotation D, thus toward the drive pin 40.

FIG. 4 *d*) shows a perpendicular cut through the partially illustrated fitting 1. The handle actuator 52 is shown together here with the drive pin actuator 60 in the blocking position A of the blocking device 70.

It is also clear in FIG. 4 *d*) that the blocking elements 71 of the blocking device 70 are engaged in the blocking recesses 61 of the drive pin actuator 60. In the first handle position, the handle actuator is in a plane lying above the blocking device, such that the actuating elements 51 lie outside a functional region of the blocking device.

FIGS. 5 *a*)-*d*) show perspective and partially cutaway schematic illustrations of an embodiment of a fitting 1 in a releasing position B.

FIG. 5 *a*) shows a side view of the fitting with the handle 10, the stop element 20, and the drive pin 40, with the handle in the second position II, wherein the handle 10 is at a distance to the stop element 20 along the axis of rotation D in this second position II, that is smaller than the distance when the handle is in the first position I (cf. FIG. 4 *a*)).

FIG. 5 *b*) shows a perspective, partial illustration of the fitting with the drive pin 40, the base insert 26 of the stop element 20, the blocking device 70, the drive pin actuator 60 and the handle actuator 52. The handle actuator 52 is engaged with the drive pin actuator 60 in the second handle position II shown herein.

The blocking device 70 is in the releasing position B. In this case, the blocking elements 71 of the blocking device 70 that are inserted in the recesses 21 are not engaged in the blocking recesses 61 in the drive pin actuator 60.

The blocking elements 71 of the blocking device 70 are pushed by the actuating elements 51 of the handle actuator into the recesses 21 of the based element 28, counter to the tension of the springs 72, until the blocking elements 71 are disengaged from the blocking recesses 61.

In the releasing position B, the drive pin actuator is not non-rotatably blocked by the blocking device, such that a torque can be transferred between the handle actuator 52 and the handle 10 that is connected to the handle actuator 52 for conjoint rotation, and the drive pin 40.

The torque is transferred in particular via the coupling established by the coupling element 50. The coupling is obtained in particular between the handle actuator 52 and the drive pin actuator 60.

FIG. 5 c) shows a section, cut along a cutting plane perpendicular to the axis of rotation D, through the base insert 26, the blocking device 70, the drive pin actuator 60 in the region of the first flange segment 62, the handle actuator in the region of the flange segment, and in particular in the region of the actuating elements 51 and the drive pin 40, which is placed in the drive pin receiver 67 of the drive pin actuator 60.

It is clear here that the actuating elements 51 keep the blocking elements 71 disengaged from the blocking recesses 61 and the recesses 68. Furthermore, the engagement elements 57 are engaged in the recesses 68, such that a coupling is obtained between the handle actuator 52 and the drive pin actuator 60, in particular for a rotation about the axis of rotation D. The coupling ensures that a torque can be transferred between the drive pin actuator 60 and the handle actuator 52, wherein the coupling element 50 is oriented such that the drive pin 40 can be actuated by the handle 10 when the handle is in the second position II and the blocking device 70 is in the releasing position B.

FIG. 5 d) shows a perpendicular section through the partially shown fitting 1. The handle actuator 52 is shown here with the drive pin actuator 60 and the handle actuator when the blocking device 70 is in the releasing position B.

It is likewise visible in FIG. 5 d) that the blocking elements 71 of the blocking device 70 are not engaged in the blocking recesses 61 of the drive pin actuator 60. This is obtained in that the handle is moved along the axis of rotation D into the second position II in the handle actuator 52 via the axial actuation of the handle 10.

When the handle is in the second position II, the handle actuator 52 is engaged with the drive pin actuator via at least the actuating elements 51, wherein the actuating elements 51 complement the circumferential surface 63 of the first flange segment 62 of the drive pin actuator. The blocking elements 71 are not engaged with the drive pin actuator, wherein the blocking elements 71 lie in the recesses 21 in the base insert 26 and are pushed against the circumferential surface 63 of the first flange segment 62 that is complemented by the actuating elements 51 due to the tension of the springs 72.

FIG. 6 shows a perspective schematic exploded illustration of an embodiment of a stop element 20 with a handle actuator 53.

In this illustration, actuating elements 51 and engagement elements 57, described above, can be readily seen on the end facing the stop element.

The base element 28 of the stop element 20 is also shown therein. The stop element 20 contains positioning pockets 22 in the base element 28, which can be brought into engagement with the positioning webs 66 of the handle actuator 52 when the handle is in the first position I.

When the handle is in the second position II, the positioning webs 66 are not engaged in the positioning pockets 22.

The positioning pockets 22 have the same Y-shaped configuration to one another as the positioning webs 66 on the side of the flange segment 55 of the handle actuator 52 facing the handle 10.

FIG. 7 shows a perspective schematic illustration of another embodiment of a stop element 20 with a handle actuator 53.

In this drawing, the cover plate 25 of the stop element 20 is not shown, such that the reinforcement 23 lying beneath the cover plate in the stop element is visible. The reinforcement 23 has recesses lying in the region of the positioning pockets 22. The positioning pockets 22 open toward the flange segment 55 of the handle actuator 52. The handle actuator 52 is guided through a central hole in the stop element 20 and passes through the stop element 20 with the neck section 53 at the side where the handle is.

The recesses 24 in the reinforcement 23 stabilize the base element 28, such that the handle actuator 52 with the positioning webs 66 is non-rotatably secured by the reinforcement against rotation about the axis of rotation D. The forces acting on the positioning webs 66 and the positioning pockets 22 when it is attempted to actuate the handle in the first position through a rotation about the axis of rotation D, are absorbed by the reinforcement, and evenly distributed to the surrounding base element 28, and lastly deflected over the entire stop element 20 with the base element 26 and the cams 27.

FIG. 8 shows a cutaway schematic illustration of an embodiment of a fitting 1 with a locking device, in particular a lock 81. The lock has a closing mechanism, which pushes a bolt 82 against the cover plate 25 of the stop element 20 in the latching position, such that a movement of the handle 10 from the first position I to the second position II is prevented.

FIG. 9 shows a cutaway schematic illustration of an embodiment of a fitting 1 with a locking device, in particular a locking slide 83. A bolt 84 can be actuated by the locking slide 83, which engages in the receiving space 56 in the handle actuator 52 and blocks an axial movement of the handle actuator 52 in relation to the drive pin actuator 60, or vice versa. In this manner, the handle 10 is locked in the first position I by means of the locking device 80.

FIG. 10 shows a cutaway perspective schematic illustration of an embodiment of a fitting 1. In this embodiment, the handle 10 is tensioned against the stop element 20 in order to ensure that the handle is in the first position I, in that the tension is obtained via an internal spring 95 and an external spring 96. The external spring 96 is located between the handle 10 and the cover plate 25 of the stop element 20, and engages at least partially in the neck 11 of the handle 10.

The drive pin actuator 60 is designed such that it has a recess in a region facing the handle, in which the internal spring 95 lies in part. The internal spring 95 is located in the receiving space 56 in the handle actuator 52, and bears on the boundary of the handle actuator 52 and/or the fastening means 12 at the handle side.

The coupling is pushed apart by the internal spring 95 and the external spring 96 in an axial direction along the axis of rotation D. This tensioning is counteracted by the base element 28, against which the handle actuator 52 bears with the positioning webs 66.

The positioning webs 66 allow the handle to assume the first position I when engaged with the positioning pockets 22, wherein, when the positioning webs 66 are disengaged from the positioning pockets 22, the handle is kept in the second position II.

FIG. 11 shows a partially cutaway perspective schematic illustration of an embodiment of a fitting 1 with a coupling element and a blocking device 70.

In this embodiment, the blocking device acts in the axial direction. The blocking element 71 is supported in this case such that it can be displaced axially in a recess 21 in the stop element 20 by the tension exerted by a spring 72.

When the handle actuator is actuated axially, it can be brought into engagement with the drive pin actuator 60 via the actuating element 51, by means of which the blocking element 71 can be disengaged from the blocking recess 61 in the first flange segment 62 of the drive pin actuator 60.

FIG. 12 shows a cutaway schematic illustration of an embodiment of a fitting 1 with a coupling element 50 and a blocking device 70, wherein the blocking device 70 acts in the axial direction, as described above.

The coupling element 50 is shown in coupled state, i.e. the handle 10, not shown in FIG. 12, is in the second position II, and the blocking device 70 is in the releasing position B.

FIG. 12 also shows a latching element 90 with a latching element spring 91, which is pretensioned against the first flange segment 62. The latching element 90 can retain the coupling element 50 in latching positions corresponding to the defined positions of the handle. In order to exit the latching positions, i.e. disengage the latching element 90 from the latching depressions 65, not shown in FIG. 12, the user must exert an increased force, wherein a feedback is generated that can be felt by the user upon reaching a latching position.

FIG. 13 shows a perspective schematic illustration of an embodiment of a coupling element 50 for a fitting 1. The coupling element 50 is designed such that the neck section 68a of the drive pin actuator 60 and the receiving space 56 in the handle actuator 52 are covered over a particularly long axial length in the assembled state. This improves the guidance of the handle 10 in the fitting 1.

According to this embodiment, radial outer projections 68c and radial inner projections 68c are located in the first flange segment 62 of the drive pin actuator 60, which can be brought into engagement with corresponding radial outer and radial inner recesses 59 in the handle actuator, when the handle is in the second position II.

FIG. 14 shows a perspective schematic illustration of an embodiment of a coupling element 50 for a fitting 1, seen from the perspective of the stop element 20. In this perspective, the radial outer and radial inner recesses 59 of the handle actuator can be readily seen. The recesses are located in the flange region 55 of the handle actuator 52.

The invention is not limited to the any of the embodiments described above, and instead can be implemented in a number of ways. As such, the coupling element 50 can have an integral design, and brought into engagement with a blocking device 70 located in the stop element 20 such that the coupling element 50 brings the blocking device 70 into engagement with the drive pin 40 in order to obtain the blocking position A, or disengages the blocking device 70 from the drive pin 40, or allows it to become disengaged therefrom, in order to obtain the releasing position B.

It can also be the case that the blocking device 70 reaches the blocking position A when the handle 10 is in the second position II and the releasing position is reached when the handle is in the first position I.

Furthermore, the coupling element 50 can be designed such, when it has a two-part design, that the handle actuator 52 is inserted into the drive pin actuator 60.

It is clear that a fitting 1 has a handle 10 for actuating a mechanism in a door or a window, which can be rotated about an axis of rotation D, is supported on or in a stop element 20, wherein the stop element 20 can be fastened to the door or window. The fitting also has a drive pin 40 for actuating the mechanism in the door or window, a coupling element 50 for coupling the handle 10 to the drive pin 40, and a blocking device 70, which blocks actuation of the drive pin 40 about the axis of rotation D when in the blocking position A, wherein the blocking device 70 can be moved to a releasing position B by axially actuating the handle form a first position to a second position along the axis of rotation D. In order to increase security against unauthorized actuation of the fitting or the mechanism connection to the fitting in a window or door, and to obtain a fitting that is easy to manipulate and inexpensive to produce, it is provided that the handle is decoupled from the drive pin 40 in the first position, wherein the blocking device 70 is then in the blocking position A, in that the coupling element 50 couples the handle 10 to the drive pin 40 in the second position of the handle, and retains the blocking device 70 in the releasing position B. Upon reaching the second position, the handle is then coupled to the drive pin, and the mechanism can be actuated.

All of the features and advantages, including structural details, spatial arrangements, and method steps, that can be derived from the claims, the description, and the drawings, can be regarded as substantial to the invention, in and of themselves or in various combinations.

| | List of Reference Symbols |
|---|---|
| 1 | fitting |
| 10 | handle |
| 11 | handle neck |
| 12 | fastening means |
| 13 | return spring |
| 14 | receiving region |
| 20 | stop element |
| 21 | recess |
| 22 | positioning pocket |
| 23 | reinforcement |
| 24 | recess |
| 25 | cover plate |
| 26 | base insert |
| 27 | cam |
| 28 | base element |
| 40 | drive pin |
| 50 | coupling element |
| 51 | actuating element |
| 52 | handle actuator |
| 53 | neck section |
| 54 | multi-sided region |
| 55 | flange segment |
| 56 | receiving space |
| 57 | engagement element |
| 58 | surface |
| 59 | recess |
| 60 | drive pin actuator |
| 61 | locking recess |
| 62 | first flange |
| 62a | segment surface |
| 62b | end surface |
| 63 | circumferential surface |
| 64 | second flange segment |
| 65 | latching depression |
| 66 | positioning web |
| 67 | drive pin receiver |
| 68 | recess |
| 68a | neck section |

-continued

List of Reference Symbols

| | |
|---|---|
| 68b | closure |
| 68c | projection |
| 69 | spring |
| 70 | blocking device |
| 71 | locking element |
| 72 | spring |
| 80 | locking device |
| 81 | lock cylinder |
| 82 | bolt |
| 83 | locking slide |
| 84 | bolt |
| 90 | latching element |
| 91 | latching element spring |
| 95 | internal spring |
| 96 | external spring |
| D | axis of rotation |
| A | locked position |
| B | releasing position |
| I | first handle position |
| II | second handle position |

The invention claimed is:

1. A fitting (1) for actuating a mechanism in a door or window,
   that has a handle (10) rotatably supported on or in a stop element (20) such that it can rotate about an axis of rotation (D),
   wherein the stop element (20) can be fastened to the door or window,
   that has a drive pin (40) for actuating the mechanism in the door or window,
   that has a coupling element (50) for coupling the handle (10) to the drive pin (40), and
   that has a blocking device (70), which blocks actuation of the drive pin (40) about the axis of rotation (D) when in the blocking position (A),
   characterized in that:
   a. the blocking device (70) is movable between the blocking position (A) and a releasing position (B) by axially actuating the handle between a first position (I) and a second position (II) along the axis of rotation (D),
   b. the blocking device (70) releases the mechanism when the blocking device (70) is in the releasing position (B),
   c. when the handle (10) is in the first position (I), the blocking device (70) is in the blocking position (A) and the handle (10) is decoupled from the drive pin (40), and
   d. only when the handle is in the second position (II), the coupling element (50) couples the handle (10) to the drive pin (40) and keeps the blocking device (70) in the releasing position (B).

2. The fitting according to claim 1, characterized in that the coupling element (50) has at least one actuating element (51) for the blocking device (70).

3. The fitting according to claim 1, characterized in that the blocking device (70) has at least one blocking element (71), which is placed separately in the stop element (20).

4. The fitting according to claim 3, characterized in that the blocking elements (71) can be moved radially or axially in relation to the axis of rotation (D), wherein a force is applied each blocking element (71) in the radial or axial direction in relation to the axis of rotation (D).

5. The fitting according to claim 3, characterized in that the blocking elements (71) are engaged directly or indirectly with the drive pin (40) when in the blocking position (A).

6. The fitting according to claim 1, characterized in that the coupling element (50) has a two-part design, wherein the coupling element (50) has a handle actuator (52) that is connected to the handle (10) for conjoint rotation, and has a drive pin actuator (60) that is connected to the drive pin (40) for conjoint rotation.

7. The fitting according to claim 6, characterized in that actuating elements (51) of the coupling element (50) are formed on the handle actuator (52).

8. The fitting according to claim 6, characterized in that the drive pin actuator (60) has at least one blocking recess (61) for receiving the blocking elements (71).

9. The fitting according to claim 6, characterized in that the drive pin actuator (60) has a first flange segment (62).

10. The fitting according to claim 9, characterized in that blocking recesses (61) are located in the first flange segment (62).

11. The fitting according to claim 6, characterized in that at least one recess (68) is located in a surface (62a) facing the handle (10) of an end surface (62b) of the drive pin actuator (60).

12. The fitting according to claim 6, characterized in that actuating elements (51) engage in blocking recesses (61) in the drive pin actuator (60) when the handle is in the second position (II).

13. The fitting according to claim 6, characterized in that the drive pin actuator (60) has a neck section (68) at the side where the handle is.

14. The fitting according to claim 6, characterized in that the drive pin actuator (60) has a second flange segment (64), wherein there is at least one latching depression (65) for at least one latching element (90) in the second flange segment (64) or the first flange segment (62), on the circumference thereof.

15. The fitting according to claim 6, characterized in that the handle actuator (52) has at least one positioning web (66), and in that the stop element (20) has at least one positioning pocket (22) for the positioning webs, wherein each positioning web (66) can be brought into engagement with the respective dedicated positioning pocket (22) when the handle is in the first position (I).

* * * * *